United States Patent
Jonker et al.

(10) Patent No.: US 9,566,688 B2
(45) Date of Patent: Feb. 14, 2017

(54) INSERT FOR AN ATTACK TOOL, METHOD FOR MAKING SAME AND TOOLS INCORPORATING SAME

(75) Inventors: Cornelis Roelof Jonker, Springs (ZA); Roger William Nigel Nilen, Springs (ZA); Anthony Albert DiGiovanni, Houston, TX (US)

(73) Assignees: Baker Hughes Incorporated, Houston, TX (US); Element Six Limited, County Clare (IE)

( * ) Notice: Subject to any disclaimer, the term of this patent is extended or adjusted under 35 U.S.C. 154(b) by 728 days.

(21) Appl. No.: 13/124,855

(22) PCT Filed: Oct. 21, 2009

(86) PCT No.: PCT/IB2009/054649
§ 371 (c)(1),
(2), (4) Date: May 24, 2011

(87) PCT Pub. No.: WO2010/046863
PCT Pub. Date: Apr. 29, 2010

(65) Prior Publication Data
US 2011/0226532 A1    Sep. 22, 2011

(30) Foreign Application Priority Data

Oct. 21, 2008 (GB) .................................. 0819257.7

(51) Int. Cl.
*E21B 10/567* (2006.01)
*B24D 3/10* (2006.01)
(Continued)

(52) U.S. Cl.
CPC ................. *B24D 3/10* (2013.01); *B22F 7/062* (2013.01); *B23B 27/14* (2013.01); *B23B 27/148* (2013.01);
(Continued)

(58) Field of Classification Search
CPC ...... B22F 7/06; C22C 26/00; C22C 2026/006; E21B 10/567; E21B 10/5673; E21B 10/5735; B01J 2203/062; B01J 2203/0655
(Continued)

(56) References Cited

U.S. PATENT DOCUMENTS 4,505,746 A    3/1985   Nakai et al.
4,694,914 A    9/1987   Obrecht
(Continued)

FOREIGN PATENT DOCUMENTS

CN        86103664 A     2/1987
CN        1200077 A     11/1998
(Continued)

OTHER PUBLICATIONS

Delwiche et al., American Society of Mechanical Engineers, Petroleum Division, v. 40, and Drilling Technology 1992, p. 51-60.
(Continued)

*Primary Examiner* — Kipp Wallace
(74) *Attorney, Agent, or Firm* — TraskBritt (57) ABSTRACT

The invention relates to an insert for an attack tool, the insert comprising a super-hard cap having a volume and bonded to a substrate at an interface, the super-hard cap having an average Young's modulus of greater than 900 GPa and the substrate characterized in that it comprises a reinforcing bolster portion as a means for stiffening a region of the substrate proximate the interface, the reinforcing bolster portion having an aggregate volume that is greater than that of the super-hard cap and an average Young's modulus at least 60% that of the super-hard cap. The invention further relates to a method for manufacturing such an insert and a method for using such an insert.

18 Claims, 4 Drawing Sheets

(51) Int. Cl.
*B22F 7/06* (2006.01)
*C22C 26/00* (2006.01)
*C22C 29/06* (2006.01)
*E21B 10/46* (2006.01)
*E21B 10/573* (2006.01)
*B23B 27/14* (2006.01)
*B24D 18/00* (2006.01)

(52) U.S. Cl.
CPC ........... *B24D 18/0009* (2013.01); *C22C 26/00* (2013.01); *C22C 29/06* (2013.01); *E21B 10/46* (2013.01); *E21B 10/567* (2013.01); *E21B 10/5735* (2013.01); *B22F 2999/00* (2013.01); *B23B 2226/315* (2013.01); *C22C 2204/00* (2013.01)

(58) Field of Classification Search
USPC .. 175/420.2, 405.1, 434, 433, 428; 428/212, 332, 408, 469; 75/242
See application file for complete search history.

(56) References Cited

U.S. PATENT DOCUMENTS

| | | | |
|---|---|---|---|
| 4,694,918 A | 9/1987 | Hall | |
| 4,811,801 A | 3/1989 | Salesky et al. | |
| 5,151,107 A * | 9/1992 | Cho et al. | 51/295 |
| 5,158,148 A | 10/1992 | Keshavan | |
| 5,304,342 A | 4/1994 | Hall | |
| 5,370,195 A | 12/1994 | Keshavan et al. | |
| 5,453,105 A | 9/1995 | Middlemiss et al. | |
| 5,470,807 A * | 11/1995 | Lai | C04B 35/645 33/201 |
| 5,723,177 A | 3/1998 | Brandrup-Wognsen et al. | |
| 5,786,075 A | 7/1998 | Mishuku et al. | |
| 5,889,219 A | 3/1999 | Moriguchi et al. | |
| 6,214,079 B1 | 4/2001 | Kear et al. | |
| 6,258,139 B1 * | 7/2001 | Jensen | 51/307 |
| 6,315,066 B1 | 11/2001 | Dennis | |
| 6,443,248 B2 * | 9/2002 | Yong et al. | 175/428 |
| 6,673,439 B1 | 1/2004 | Miyamoto et al. | |
| 6,719,074 B2 | 4/2004 | Tsuda et al. | |
| 6,919,040 B2 | 7/2005 | Fries et al. | |
| 7,033,408 B2 | 4/2006 | Fries et al. | |
| 2005/0210755 A1 * | 9/2005 | Cho et al. | 51/293 |
| 2006/0162969 A1 * | 7/2006 | Belnap et al. | 175/433 |
| 2006/0166615 A1 | 7/2006 | Tank et al. | |
| 2007/0186483 A1 | 8/2007 | Tank et al. | |
| 2007/0205023 A1 * | 9/2007 | Hoffmaster | E21B 10/43 175/408 |
| 2008/0124566 A1 * | 5/2008 | Smallman | C22C 26/00 428/606 |
| 2008/0179109 A1 * | 7/2008 | Belnap et al. | 175/432 |
| 2008/0206576 A1 * | 8/2008 | Qian et al. | 428/446 |
| 2011/0226532 A1 * | 9/2011 | Jonker et al. | 175/57 |
| 2013/0048388 A1 * | 2/2013 | Griffo et al. | 175/428 |

FOREIGN PATENT DOCUMENTS

| | | |
|---|---|---|
| EP | 0235455 A2 | 9/1987 |
| EP | 1028171 A1 | 8/2000 |
| GB | 2345710 | 7/2000 |
| GB | 2374618 | 10/2002 |
| GB | 2426223 | 11/2006 |
| WO | 02/24601 A1 | 3/2002 |
| WO | 02/24603 A1 | 3/2002 |
| WO | 03/064806 A1 | 8/2003 |
| WO | 2005068113 | 7/2005 |
| WO | 2006099194 | 9/2006 |
| WO | 2007020518 | 2/2007 |
| WO | 2008/053431 A1 | 5/2008 |

OTHER PUBLICATIONS

PCT Search Report for PCT/IB2009/054649 dated Mar. 25, 2010.
PCT Search Report for PCT/IB2009/054645 dated Feb. 24, 2010.
International Preliminary Report on Patentability for International Application No. PCT/IB2009/054645 dated Apr. 26, 2011, 7 pages.
International Preliminary Report on Patentability for International Application No. PCT/IB2009/054649 dated Apr. 26, 2011, 6 pages.
International Written Opinion for International Application No. PCT/IB2009/054645 dated Feb. 24, 2010, 6 pages.
International Written Opinion for International Application No. PCT/IB2009/054649 dated Mar. 25, 2010, 5 pages.

* cited by examiner

INSERT FOR AN ATTACK TOOL, METHOD FOR MAKING SAME AND TOOLS INCORPORATING SAME

CROSS-REFERENCE TO RELATED APPLICATIONS

This application was filed under 35 U.S.C. §371 as a National Stage application of PCT International Application Serial No. PCT/IB2009/054649, filed Oct. 21, 2009. PCT International Application Serial No. PCT/IB2009/054649 claims priority to UK Patent Application GB 0 819 257.7, filed Oct. 21, 2008, which is incorporated herein by reference in its entirety.

TECHNICAL FIELD

The invention relates to super-hard capped inserts for use in attack tools and cutters, a method for making same and tools incorporating same, particularly tools such as picks, percussive drilling bits and rotary drilling bits, as may be used in the mining, tunneling, road construction and oil and gas drilling industries to process or degrade pavements or rock formations, or to bore into the earth.

BACKGROUND

Boring into the earth is an important activity in many industries, such as mining, oil and gas drilling, prospecting and tunnel construction. A wide variety of methods and various different types of bits are available for this purpose. Earth-boring typically requires rock to be broken in either or both of two principal modes, namely shear cutting or crushing, both of which methods are effected by means of rock-engaging hard inserts of some kind that are mounted onto a drill bit. Shear cutting involves inserts removing rock material by cutting into it and shearing off material. Crushing involves inserts repeatedly impacting on the rock and crushing it. Percussion drilling is an example of the latter and is widely used in mining and construction, to drill boreholes and blast holes, for example. In soft rock mining and pavement degradation, pick-like attack tools or picks may be used to break rock, concrete or asphalt.

Polycrystalline diamond (PCD) is a super-hard material comprising a mass of inter-grown diamond grains and interstices between the diamond grains. PCD is typically made by subjecting an aggregated mass of diamond grains to an ultra-high pressure and temperature. Material wholly or partly filling the interstices may be referred to as filler or binder material. PCD is typically formed in the presence of a sintering aid such as cobalt, which promotes the inter-growth of diamond grains. The sintering aid is commonly referred to as a solvent/catalyst material for diamond, owing to its function of dissolving diamond to some extent and catalyzing its re-precipitation. Consequently, the interstices within the sintered PCD product are wholly or partially filled with residual solvent/catalyst material. Most typically, PCD is often formed on a cobalt-cemented tungsten carbide substrate, which provides a source of cobalt solvent/catalyst for the PCD. PCD is used in a wide variety of tools for cutting, machining, drilling or degrading hard or abrasive materials such as rock, metal, ceramics, composites and wood-containing materials. For example, PCD inserts are widely used within drill bits used for boring into the earth in the oil and gas drilling industry.

Delwiche et al. ("*Petroleum Division,*" v. 40, and "*Drilling Technology*" 1992, 1992, pp. 5160, "American Society of Mechanical Engineers") disclose PCD inserts for oil and gas drilling, wherein a PCD layer is secured to a substrate comprising a diamond-impregnated, or "impreg", back-up component. It is apparent from the diagrams and photographs that the diamond grains are coarse and sparsely distributed.

European Patent No. 0 235 455 discloses an insert for a rock bit comprising a pre-cemented tungsten carbide body having a cylindrical grip length extending along a major portion of the insert. The above-mentioned reference also discloses a progressive decrease in the modulus of elasticity through transition layers from an outer ultra-hard diamond layer to the carbide body, in order to reduce spalling.

U.S. Pat. No. 4,811,801 discloses a rock bit insert including a polycrystalline diamond surface on an insert body having a head portion made from a material with elasticity and thermal expansion properties advantageously tailored for use in three types of rock bits, as well as the three types of rock bits made with such inserts.

U.S. Pat. No. 5,304,342 discusses that for a given application, it is desirable to provide the stiffest possible WC—Co cemented carbide substrate, that is, one with a high modulus of elasticity, thereby minimizing the deflection of the PCD layers and reducing the likelihood of PCD failure. However, if the modulus of elasticity is too high, the inserts are prone to break off during drilling.

U.S. Pat. No. 6,258,139 discloses a PDC (polycrystalline diamond compact) with an internal diamond core in the substrate, to provide additional diamond for exposure when the substrate is sufficiently eroded. Also disclosed, is a PDC with an internal carbide core, which is entirely enclosed by the diamond region of the PDC cutter, to avoid high tensile stresses in the diamond region.

There is a need to minimize the thickness of super-hard material in attack tool inserts and consequently their costs while achieving high impact resistance. This is especially important for rock or pavement degradation or drilling applications.

BRIEF SUMMARY

According to a first aspect of the invention there is provided an insert for an attack tool, the insert comprising a super-hard cap having a volume and bonded to a substrate at an interface, the super-hard cap having an average Young's modulus of greater than 900 GPa and preferably greater than 960 GPa; the substrate characterized in that it comprises a reinforcing bolster portion as a means for stiffening a region of the substrate proximate the interface, the reinforcing bolster portion having an aggregate volume that is greater than that of the super-hard cap and an average Young's modulus at least 60% that of the super-hard cap.

The reinforcing bolster portion may be disposed adjacent (proximate) the interface.

In some embodiments, the reinforcing bolster portion may have an aggregate volume that is at least a factor of three times greater, preferably five times greater, and more preferably ten times greater than that of the super-hard cap.

In some embodiments, the reinforcing bolster portion may have an average Young's modulus of at least 60% that of the super-hard cap, more preferably 70%, yet even more preferably 80% and yet more preferably 90%. In one embodiment, the average Young's modulus of the reinforcing bolster portion is in the range of about 60% to 80% that of the super-hard cap.

In one embodiment, the reinforcing bolster portion may comprise super-hard material, typically in granular or particulate form. Preferably, the reinforcing bolster portion comprises diamond or cubic boron nitride (CBN), and more preferably, it comprises diamond. In one embodiment, the reinforcing bolster portion may comprise PCD.

In one embodiment, the reinforcing bolster portion may comprise tungsten carbide, or it may comprise tungsten carbide and diamond.

Preferably, the reinforcing bolster portion comprises grains of a super-hard material dispersed within a binder metal, such as cobalt. Preferably, the average size of the super-hard grains is at least about 15 microns, more preferably at least about 20 microns, more preferably at least about 70 microns, even more preferably at least about 150 microns, and yet more preferably at least about 200 microns. Use of coarser super-hard grains may have the effect of increasing the stiffness of the reinforcing bolster portion, all else being equal.

The size range of the super-hard grains included in the bolster portion may be large. For example, the size range of the super-hard grains may be from about 1 micron to about 500 microns. The size range of the super-hard grains included in the bolster portion may be formed of more than one size distribution, and more than one "modal" peak may be evident within the overall size distribution of the super-hard grains. At least one of the modes may have an average size distribution of greater than about 50 microns.

The size distribution of unbonded or free-flowing diamond grains is measured by means of a laser diffraction method, wherein the grains are suspended in a fluid medium and an optical diffraction pattern is obtained by directing a laser beam at the suspension. The diffraction pattern is interpreted by computer software and the size distribution is expressed in terms of equivalent circle diameter. In effect, the grains are treated as being spherical and the size distribution is expressed in terms of a distribution of equivalent diameters of spheres. A MASTERSIZER™ apparatus from Malvern Instruments Ltd, United Kingdom, may be used for his purpose.

A multi-modal size distribution of a mass of grains is understood to mean that the grains have a size distribution that is formed of more than one peak, each peak corresponding to a respective "mode." Multimodal polycrystalline bodies are typically made by providing more than one source of a plurality of grains, each source comprising grains having a substantially different mean size, and blending together the grains from the sources. Measurement of the size distribution of the blended grains typically reveals distinct peaks corresponding to distinct modes. When the grains are sintered together to form the polycrystalline body, their size distribution is further altered as the grains are compacted against one another and fractured, resulting in the overall decrease in the sizes of the grains. Nevertheless, the multimodality of the grains is usually still clearly evident from image analysis of the sintered article.

In order to obtain a measure of the sizes of diamond grains within PCD, a method known as "equivalent circle diameter" is used. In this method, a scanning electron micrograph (SEM) image of a polished surface of the PCD material is used. The magnification and contrast should be sufficient for at least several hundred diamond grains to be identified within the image. The diamond grains can be distinguished from metallic phases in the image by a circle equivalent in size for each individual diamond grain, which can be determined by means of conventional image analysis software. The collected distribution of these circles is then evaluated statistically. Whenever diamond mean grain size within PCD material is referred to herein, it is understood that this refers to the mean equivalent circle diameter.

In one embodiment of this aspect to the invention, the super-hard cap may be bonded to the reinforcing bolster portion at a first interface, the substrate comprising a reinforcing bolster portion at one end and a support portion at an opposing end, the reinforcing bolster portion being bonded to the support portion at a second interface. Preferably, the first interface is non-planar. Preferably the second interface is substantially planar. Where a support portion is present, the assembly of the support portion and the reinforcing bolster portion is referred to as the substrate portion of the insert. Where there is no support portion, the substrate may consist of the reinforcing bolster portion alone.

In one embodiment, the reinforcing bolster portion comprises metal or metal alloy-cemented metal carbide and diamond in granular or particulate form, whereas the support portion, if present, is substantially devoid of diamond. In other words, the bolster comprises diamond-enhanced carbide (DEC) material. Preferably the diamond grains are dispersed substantially homogeneously throughout the reinforcing bolster portion. The diamond grains within the reinforcing bolster portion may have an average size of at least 200 microns.

In one embodiment, the reinforcing bolster portion may be in the form of a frustum or a core that is fully or partially embedded within the substrate.

Preferably, the super-hard cap, reinforcing bolster portion and the rest of the substrate (i.e., the support portion) are integrally formed and bonded at conditions under which diamond is thermodynamically stable.

Preferably, the average Young's modulus of the super-hard cap is greater than 1000 GPa.

Preferably, the super-hard cap comprises polycrystalline diamond (PCD).

In one embodiment, the super-hard cap comprises PCD, at least one portion of which may be substantially free of solvent/catalyst material for diamond. Preferably, the at least one portion is adjacent a working surface of the super-hard cap and remote from the interface with the substrate. In one embodiment, the at least one region may be porous. In certain applications, such as earth boring or rock drilling, such embodiments may improve the thermal stability and the performance of the insert.

In some embodiments, the Young's modulus of the reinforcing bolster portion is at least about 650 GPa or at least about 675 GPa. In some embodiments, the Young's modulus of the reinforcing bolster portion is at most about 900 GPa or at most about 850 GPa. In some embodiments, the Young's modulus of the reinforcing bolster portion is in the range from about 650 GPa to about 900 GPa, or in the range from about 675 GPa to about 850 GPa.

In embodiments where the super-hard cap has average Young's modulus of greater than about 1,000 GPa, it may be beneficial for the reinforcing bolster portion to comprise a super-hard material of another type, grade and Young's modulus, such as PCD or PCBN.

Preferably the reinforcing bolster portion comprises refractory metal carbide grains, the metal being selected from W, Ti, Ta, Nb, Mo, Cr, Hf, Zr, and Si, more preferably, the metal being selected from W, Si or Ti, the grains being held together by means of a binder metal or alloy, which preferably comprises Co.

Preferably the reinforcing bolster portion comprises an iron group metal selected from Co, Fe, Mn and Ni, more preferably Co. When the super-hard cap comprises diamond, most preferably, a portion of the reinforcing bolster portion proximate the first interface with the cap comprises Co.

Preferably, both the reinforcing bolster portion and the support portion comprise metal carbide grains, the metal being selected from W, Ti, Ta, Nb, Mo, Cr, Hf, Zr, Si, more preferably, the metal being selected from W, Si or Ti, the grains being held together by means of a binder metal or alloy, which preferably comprises Co. The reinforcing bolster portion may comprise more than one type of carbide. Preferably, the average mass percentage of Co within the reinforcing bolster portion is lower than that within the support portion.

In some embodiments, the bolster portion may be substantially devoid of diamond or it may contain diamond and the cobalt content may be at most 10 wt %, at most 8 wt %, or even at most 6 wt %. In some embodiments, the cobalt content in a cemented carbide bolster portion may be at least 3 wt % or at least 4 wt %.

Preferably, the reinforcing bolster portion comprises refractory metal carbide grains, the metal being selected from W, Ti, Ta, Nb, Mo, Cr, Hf, Zr, and Si, more preferably, the metal being selected from W, Si and Ti, and a super-hard material, preferably diamond, typically in particulate or granular form, the grains being held together by means of a binder metal or alloy, which preferably comprises Co. The reinforcing bolster portion may comprise more than one type of carbide.

In some embodiments, the reinforcing bolster portion may comprise one or more than one different types of materials or composites. More specifically, it may comprise more than one layer of different types of materials or composites, the interfaces between the layers being sharp or diffuse, and typically having a portion that may be generally conformal with the interface between the reinforcing bolster portion and the super-hard tip or cap.

In one embodiment, the reinforcing bolster portion is more abrasion resistant than the support portion of the substrate and has an exposed surface, which may function as a wear resistant surface, which reduces the rate of wear of the insert.

In one embodiment, the reinforcing bolster portion extends throughout substantially the whole volume of the substrate.

In some embodiments, the reinforcing bolster portion may comprise one or more than one different type of material or composite and there may be a distinct interface between the reinforcing bolster portion and the support portion, or it may be indiscernible, graded or diffuse.

This aspect of the invention may be advantageous for use in tools used to degrade or break materials, especially rock, concrete, asphalt and the like, by means involving repeated impact, such as may be the case for pick tool inserts and percussion drilling inserts, but may also provide significant benefits for tools using shear-type cutters and rotary drilling bits.

The invention may be of particular benefit where the super-hard cap comprises PCD with Young's modulus greater than about 960, or greater than 1,000 GPa, as may typically be used in the degradation, drilling, processing or excavation of rock, concrete and asphalt, for example in the oil and gas drilling, mining and construction (tunneling) industries. It may be of particular benefit in applications where the PCD or other super-hard capped insert is caused to impact a hard body or formation in use, such as in percussive drilling, mining pick assemblies and road planing, degradation or recycling.

In some embodiments, the super-hard cap has a rounded or blunted conical form with an apex, the axial thickness of the super-hard cap at the apex being in the range of 1.14 to 2.4 mm, more preferably 1.4 to 2.3 mm. In some embodiments, the axial thickness of the super-hard cap at the apex may be at least about 0.1 mm, at least about 0.2 mm, at least about 0.5 mm or even at least 1 mm. In some embodiments, the thickness may be at most 2.4 mm, or even at most 2.3 mm. Axial thickness refers to the thickness measured from the interface, aligned with central axis of the insert.

In some embodiments, the apex may have a radius of curvature of at least 0.5 mm or at least 1.3 mm. In some embodiments, the apex may have a radius of curvature of at most 4 mm. Preferably, the apex has a radius of curvature in the range of 0.5 to 4 mm, more preferably 1.3 to 4 mm.

According to a second aspect of the invention, there is provided a method for manufacturing an insert for an attack tool, the method including providing a pre-form for a reinforcing bolster portion, a pre-form for a support portion and a pre-form for a PCD cap, assembling and contacting the pre-forms in a desired configuration to form a pre-form assembly, and subjecting the pre-form assembly to ultra-high pressure and temperature conditions at which diamond is thermodynamically stable.

Preferably, the method of making the reinforcing bolster portion pre-form of includes the steps of:
  introducing diamond grains into the starting powders of a hard-metal, which typically includes grains of refractory metal carbide, to form a starting powder blend;
  forming the starting powder blend by means of compaction in a mold to form a green compact;
  sintering the green compact at a temperature of greater than about 1,000° C., more preferably greater than 1,200° C. and at an applied pressure of less than about 1 GPa in order produce the reinforcing bolster portion pre-form.

When this method is used, it has unexpectedly been observed that the Young's modulus of the reinforcing bolster portion depends not only on the absolute content of incorporated diamond grains as one might expect from the formulae known in the art, but also on the average size of the diamond grains blended into the powder and consequently incorporated within the bolster green body. In particular, it has been observed that the Young's modulus may tend to be higher where the diamond grains are larger. For example, diamond-enhanced carbide with 7.5 wt % dispersed diamond grains of average size approximately 70 microns had a Young's modulus of about 660 GPa compared to about 580 GPa for a similar article comprising the same diamond content, but wherein the average size of the diamond grains was about 2 microns.

According to a third aspect of the invention, there is provided a method for using an insert according to the first aspect of the invention to degrade or break bodies, articles or formations comprising hard materials selected from the group comprising rock, concrete and asphalt, the method including a step of causing the superhard cap to impact the body, article or formation.

DESCRIPTION OF THE DRAWINGS

Embodiments will be described by way of non-limiting examples, and with reference to the accompanying drawings in which:

FIGS. 1(a) and (b) show a schematic diagram of a cross-section of two different shaped attack tool inserts. This embodiment of the present invention comprises a superhard cap, a support portion and a reinforcing bolster portion disposed intermediate the cap and the support portion. The working portion of the insert, the outermost portion of which is the superhard tip, has a blunted conical form with an apex. The reinforcing bolster portion at one end is bonded to the underside of the cap at a non-planar interface that is generally conformal with the working surface of the cap, and to the support portion at a substantially planar interface at an opposing end. The reinforcing bolster portion is exposed at an outer cylindrical peripheral surface of the substrate.

FIGS. 2(a) and (b) show a schematic diagram of a cross-section of two different shaped attack tool inserts. This embodiment comprises a superhard cap, a support portion and a reinforcing bolster portion embedded within the body of the substrate. The working portion of the insert, the outermost portion thereof is the superhard tip, has a blunted conical form with an apex.

FIG. 3 shows a drawing of an attack tool insert, shown partially in cross-section. This embodiment comprises a super-hard cap, a support portion and a reinforcing bolster portion disposed intermediate the cap and the support portion. The working portion of the insert, the outermost portion of which is the super-hard tip, has a blunted conical form with an apex. The reinforcing bolster portion at one end is bonded to the underside of the cap at a non-planar interface that is generally conformal with the working surface of the cap, and to the support portion at a substantially planar interface at an opposing end.

FIG. 6(a) shows a scanning electron micrograph (SEM) of a sample of a pre-form of a preferred reinforcing bolster portion embodiment, comprising WC gains and partially reconverted diamond grains, bonded by means of a cobalt binder. The diamond grains comprise diamond cores (black) surrounded by graphite (dark gray) that formed during a heat treatment process as the outer portions of the original, larger diamond grains converted to graphite. The size of the diamond grains is of the order of 100 to 200 microns. The white portion of the micrograph is the hard metal matrix (i.e., WC grains cemented with Co metallic binder).

FIG. 6(b) shows a scanning electron micrograph (SEM) of a sample of a preferred reinforcing bolster portion embodiment. The sample was prepared by subjecting the pre-form of FIG. 6(a) to ultra-high pressure and temperature conditions at which diamond is thermodynamically stable. The diamond grain cores (black) visible in the pre-form are still apparent, but the graphite that surrounded the cores in the pre-form has reconverted to diamond (black). A major portion of the reconverted diamond in the micrographs has a general appearance of halos of finer grains surrounding the cores. The average size of the diamond cores is at least an order of magnitude greater than that of the diamond grains arising from reconversion.

SPECIFIC DESCRIPTION

The term "super-hard material" as used herein is taken to mean materials with a Vickers hardness greater than about 25 GPa. Such materials include diamond, cubic boron nitride, boron sub-oxide, boron carbide, polycrystalline diamond (PCD), polycrystalline cubic boron nitride (PCBN) and silicon carbide-bonded diamond (SCD).

The term "PCBN," as used herein, is taken to mean polycrystalline cubic boron nitride, which typically comprises grains of cubic boron nitride dispersed within a binder phase comprising metallic and/or ceramic phases.

The term "PCD," as used herein, is taken to mean materials comprising sintered diamond in particulate or granular form, there being substantial direct bonding between the diamond particles.

The term "diamond-enhanced carbide,", or DEC, as used herein, is taken to mean compacts comprising diamond and a carbide phase, typically in particulate or granular form, typically dispersed within a cementing or binding phase.

The term "attack tool" is understood to mean a tool or tool insert that is used to degrade or break material, such as rock, concrete, asphalt and the like, which may be typically used in milling, mining, earth boring, degradation and excavation applications. Attack tools are typically designed to be as wear-resistant and impact-resistant as possible, although the respective relative importance of these properties would depend on the application. Attack tools include picks, cutters, percussion drilling tools and rotary drilling tools.

The term "pick tool" is understood to mean an attack tool that is adapted to break or degrade a body by a major mechanism involving a degree of penetration into the body, or at least fracture and chipping of the body. The working ends of pick tools are typically pointed or chisel-shaped.

The term "tool insert," as used herein, is taken to mean a component comprising a working portion, and is provided as a discrete unit that is adapted to be connected, attached or otherwise secured to a tool or other carrier in some way. It is not taken to imply or suggest a particular mode of connection or attachment, such as insertion into an accommodating recess.

The term "metallic alloy,", or more simply "alloy," is understood to mean a material that comprises at least one metal and has a metallic, semi-metallic or inter-metallic character. It may additionally comprise a ceramic component.

The term "cap" as in "super-hard cap" shall be taken to include a substantially rigid, at ambient conditions (i.e., non-compliant or stiff), outer layer or tip attached or bonded to a body, typically at one end of a tool insert in order, for example, to protect it from wear or to function as the principal working portion of the tool insert. A cap need not be homogeneous in structure and composition, and may, for example, comprise layers of structurally different materials.

Figure 1:
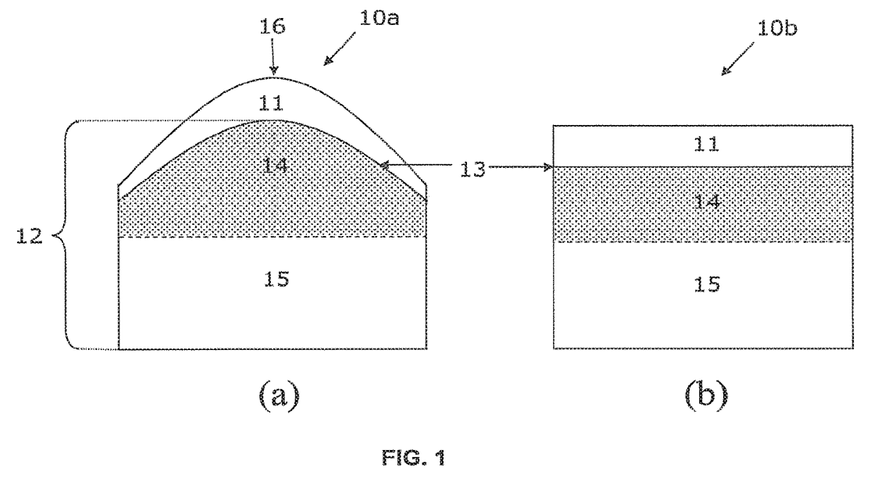

A preferred embodiment of an attack tool insert 10, of the invention shown in FIG. 1 comprises a super-hard cap 11, having a volume and bonded to a substrate 12, at an interface 13, the substrate 12 characterized in that it comprises a first reinforcing bolster portion 14, as a means for increasing the average stiffness of a region of the substrate 12 proximate the interface 13, at least part of the reinforcing bolster portion 14 being disposed proximate at least a portion of the interface 13 and having a contiguous volume that is greater than that of the super-hard cap 11 and an average Young's modulus at least 80% that of the super-hard cap 11. In the embodiment illustrated in FIG. 1, the reinforcing bolster portion 14 is a single contiguous region extending substantially from a first interface proximate the PCD cap to a second interface with a second supporting portion 15, of the substrate 12, which together with the reinforcing bolster portion 14 forms the whole substrate 12, the second interface being substantially remote from the first interface 13 and an outer surface of the reinforcing bolster portion 14 being exposed at a peripheral outer surface of the substrate 12. The insert 10 has a working end that has a pointed or chisel-like form with a crest or apex 16.

Figure 2:
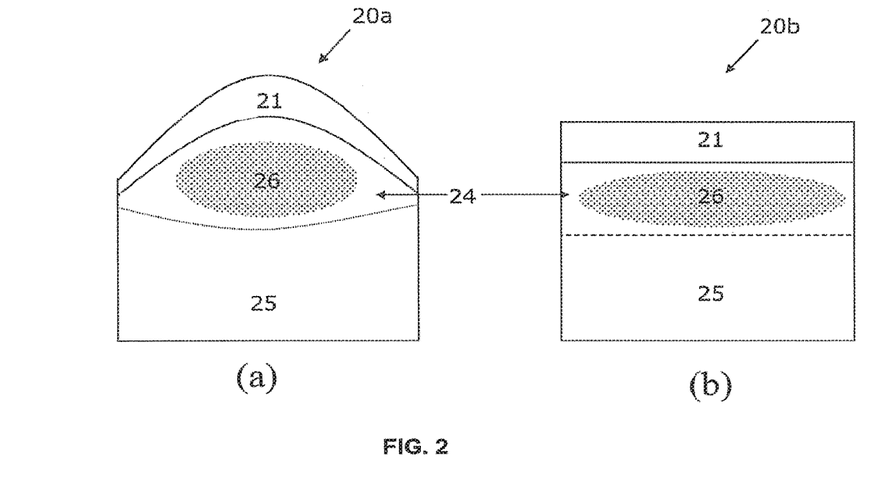

In FIG. 2, the reinforcing bolster portion 24, of an embodiment of an attack tool insert 20, comprises a material 26, with a Young's modulus greater than that of the support portion of the substrate 25, that material being embedded within the substrate body. The volume of the reinforcing bolster portion 24, does not necessarily coincide with that of the embedded material. The volume of the reinforcing bolster portion 24 is calculated as the greatest volume within the substrate 25 that may be enclosed, such that the average Young's modulus is at least 60% that of the super-hard cap 21, more preferably 70%, and yet more preferably 80%. FIG. 2 illustrates how one may select a suitable material for a reinforcing bolster portion depending on the type, grade and consequently the Young's modulus of the super-hard cap material.

It is essential that the reinforcing bolster portion has a high stiffness, which is an extensive property that depends not only on the elastic or Young's modulus, but also on its volume and shape. The reinforcing bolster portion of the invention is distinguished over so-called "inter-layers" of the prior art, in that inter-layers, which typically comprise grains of carbide and diamond bonded together by a metallic matrix, are relatively thin layers disposed intermediate an ultra-hard cap and the underlying cemented carbide substrate. The inter-layers are believed to reduce stress at the interface between the cap and the substrate, especially thermally-induced stress that may occur on cooling the insert product after HPHT sintering. While known inter-layers may have relatively high Young's modulus, their volume is typically too small to provide sufficient stiffness and support for the ultra-hard cap in use. The volume of the reinforcing bolster portion of this invention should be at least two, preferably three and preferably more than three times that of the ultra-hard cap. It must also have an average Young's modulus at least 60% that of the ultra-hard cap, preferably more than 80%.

It will be appreciated that the reinforcing bolster portion may comprise a super-hard material other than diamond or be devoid of diamond or other super-hard material.

Figure 3:
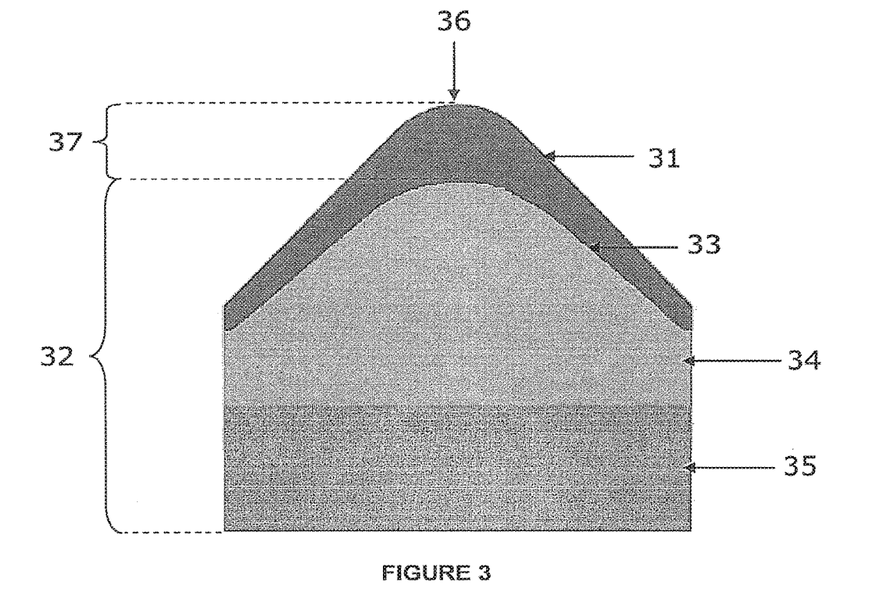

In a first preferred embodiment illustrated schematically in FIG. 3, the super-hard cap 31, comprises PCD as the major if not the whole portion, the PCD cap 31 having an average Young's modulus in the range of 750 GPa to 850 GPa, i.e., as high as possible. The super-hard cap 31 has a rounded converging or pointed form and an apex 36, that has a tip radius of curvature in the range of 1.3 to 4 mm and a thickness 37, in the range of 1.8 to 2.3 mm. The super-hard cap is integrally formed and bonded to the substrate 32, at a first non-planar interface 33, at conditions under which diamond is thermodynamically stable. The super-hard cap 31 is bonded to the reinforcing bolster portion 34, of the substrate at the first non-planar interface 33 and the reinforcing bolster portion 34, is bonded to the support portion 35, at a second interface, a portion of which may be substantially planar.

The reinforcing bolster portion 34 comprises diamond-enhanced carbide (DEC). There are many types of DEC materials and many methods of making them that are well known in the art and can be used, either as taught or adapted, for the reinforcing bolster portion of this embodiment. Examples of prior art include U.S. Pat. Nos. 4,505,746 and 5,453,105, which disclose methods for making composites comprising diamond particles, a hard phase (for example, WC) and a binder phase metal (for example, Co). In U.S. Pat. No. 5,453,105, the diamond content within the DEC is greater than 50 volume % and intergrown to a degree. HPHT sintering is employed in U.S. Pat. No. 5,786,075 that describes the synthesis of DEC for heat sink applications. U.S. Pat. No. 7,033,408 similarly relies on HPHT sintering of DEC synthesis, but also discloses that wear resistance may be further improved by including a second metal within the binder, where the second metal is a stronger carbide former than the primary binder metal. U.S. Pat. No. 5,158,148 teaches an approach in which excess non-diamond carbon is added to a carbide powder, such that the overall carbon content of the final powder mix is above the stoichiometric level of the carbide powder. The mixture of powders, in the presence of a metallic binder phase, is subjected to a conventional carbide sintering process, and the resulting sintered article contains agglomerates of non-diamond carbon material. This sintered article is subsequently subjected to a second sintering cycle, under HPHT conditions, which results in the conversion of the non-diamond carbon into diamond. The final product comprises carbide and diamond particles cemented by a metallic binder, and little or no non-diamond carbon phases. U.S. Pat. No. 6,214,079 teaches the chemical infiltration of a carbonaceous gas into a sintered, but porous, carbide body, which is subsequently subjected to an HPHT sintering cycle. As in U.S. Pat. No. 5,158,148, the non-diamond carbon is converted into diamond during this cycle.

The sintering of DEC materials at pressure and temperature conditions below the diamond stability threshold requires methods for preventing or minimising the conversion of added diamond into non-diamond carbon. Since this process of diamond degradation is known to be accelerated by the presence of metals typically used as binders within DEC materials, one strategy is to coat the diamond particles with a barrier layer that prevents or reduces the area of contact between the diamond surfaces and the binder metal (for example U.S. Pat. No. 5,723,177, European Patent No. 1,028,171 and U.S. Pat. No. 6,673,439). Another approach is to use a sintering method that requires the diamond within the compact to be held at high temperatures for a relatively short period, thereby minimizing its conversion. This can be achieved using, for example, the so-called "Field Assisted Sintering Techniques" ("FAST"), of which Spark Plasma Sintering (SPS) is a well-known example (for example, European Patent No. 1,028,171 and U.S. Pat. No. 5,889,219), as well as microwave sintering (for example, U.S. Pat. No. 6,315,066).

Figure 4:
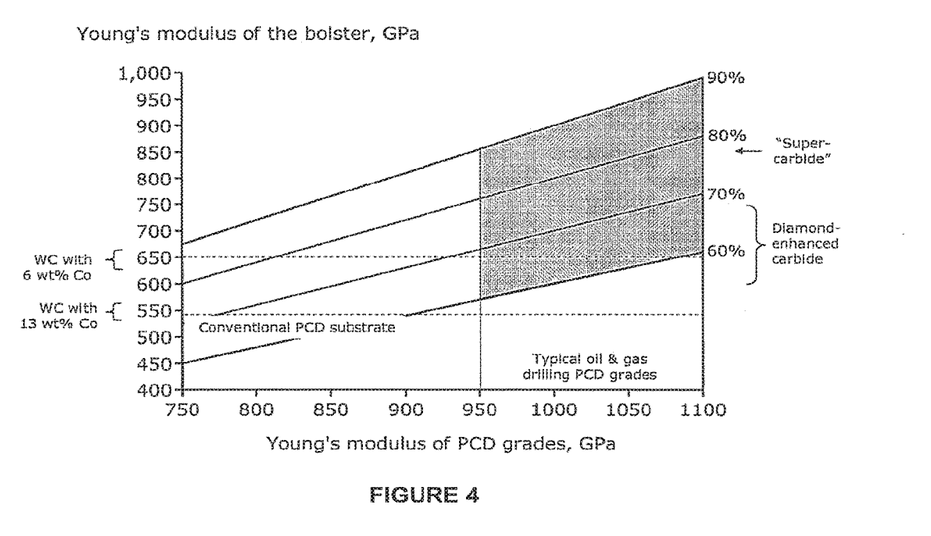
FIG. 4 shows a graph indicating range of suitable average Young's modulus values for a reinforcing bolster portion as a function of that of the super-hard cap between 750 GPa and 1,100 GPa. The range of Young's moduli of PCD grades typically used in oil and gas drilling, i.e., about 960 GPa to about 1,050 GPa, is pointed out. The ranges of Young's moduli of Co-cemented tungsten carbide grades typically used as substrates for PCD inserts and low-cobalt grades, as well as the reported ranges for cemented carbide grades enhanced with super-hard grains dispersed within them are also shown.
Figure 5:
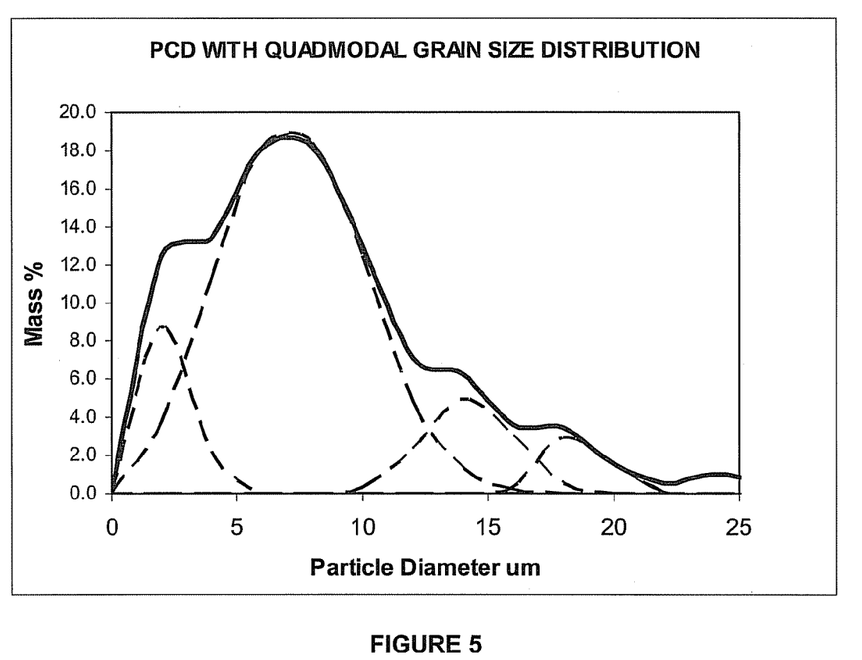
FIG. 5 shows the grain size distribution of PCD with a so-called "quad-modal size distribution," measured within a fully-sintered PCD article. The size distribution can be resolved into at least four distinct substantially normal or skew-normal distributions, with more than 80% of the diamond grains having grain size less than about 20 microns. The overall average diamond grain size is within the range of 1 to 15 microns and there is a major peak between about 5 and 10 microns.
Figure 6:
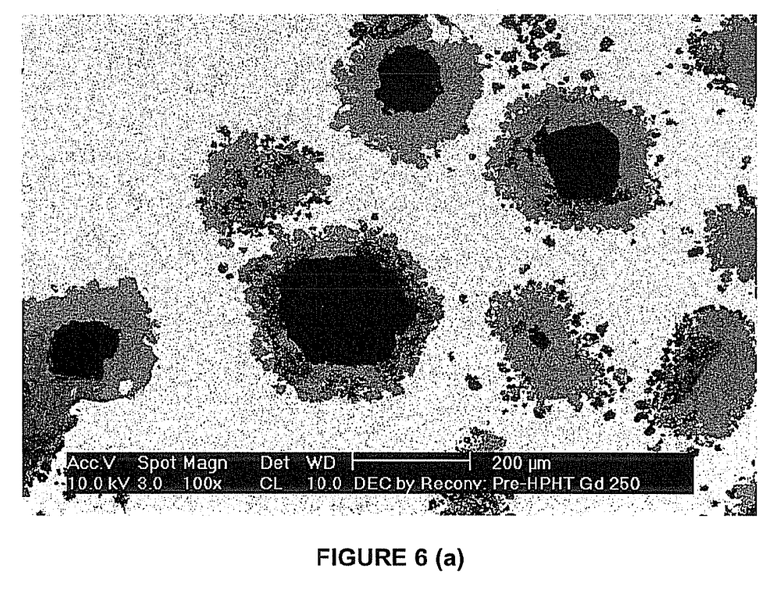
Figure 6B:
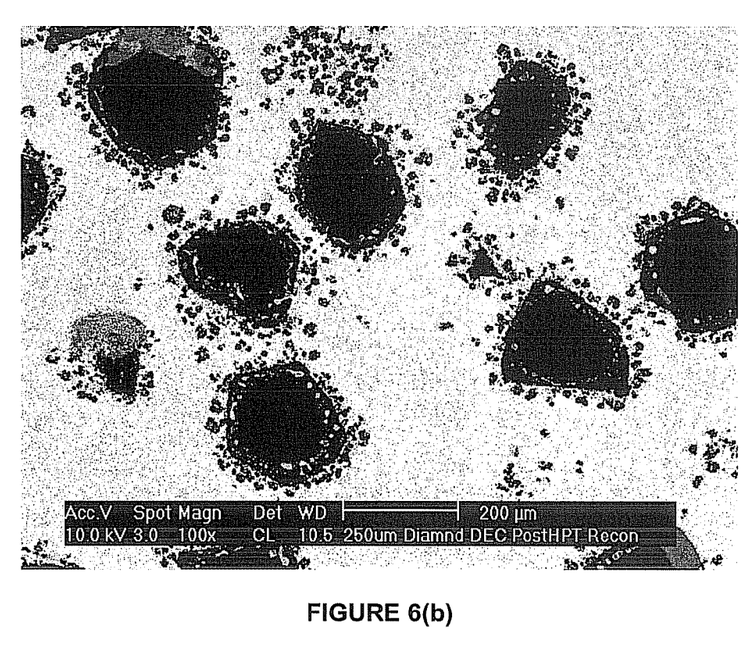

In one version of the first preferred embodiment, the reinforcing bolster portion comprises what may be described generically as "super-carbide," which comprises super-hard grains or particles in crystalline or polycrystalline form, grains of tungsten carbide and a metallic binder such as cobalt. The grains of tungsten carbide may be pre-sintered, or sintered in situ, during the same step in which the PCD cap is sintered. The super-hard grains preferably comprise diamond, although they may less preferably comprise CBN or PCBN. Variants of super-carbide and methods for their manufacture are disclosed in U.S. Pat. Nos. 5,453,105, 6,919,040 and 7,033,408, as well as certain of the references contained therein. Super-carbide is manufactured by a process that includes a step of subjecting a pre-form to ultrahigh pressure and temperature conditions at which diamond is thermodynamically stable. Super-carbide typically has a substantially lower content of super-hard material than does PCD or PCBN, and typically less than about 10 to 18 wt. %, and consequently the super-hard phase is much less intergrown than in PCD. Super-carbide with a diamond phase is thus distinguished from PCD structurally and is significantly less hard and abrasion resistant than PCD. As shown in FIG. 4, super-carbide may have Young's modulus of greater than 800 GPa or even greater than 850 GPa.

In a second preferred embodiment, the reinforcing bolster portion may comprise a cemented carbide, preferably a cobalt-cemented tungsten carbide, with a low content of metallic binder, preferably less than 8 wt. %, more preferably less than 6 wt. % metallic binder, which may be substantially devoid of super-hard grains. This is preferably used in combination with preferred features of the first preferred embodiment.

In one embodiment method of manufacturing a product according to the invention, the super-hard cap is formed integrally with the reinforcing bolster portion and the support portion under ultra-high pressure and temperature (HPHT) conditions well known in the art of PCD or PCBN manufacture. An attack tool insert pre-form comprising three sections is prepared, the first section being the support portion of the substrate, the second being a pre-form of the reinforcing bolster portion and the third being a pre-form of the PCD cap. The support and reinforcing bolster portions of the substrate are preferably pre-sintered by conventional carbide sintering means, either as separate entities or integrally. Where they are pre-sintered as separate articles, they may be bonded together during the HPHT sintering step during which the PCD cap is formed by the sintering of diamond grains. The average size of the diamond grains within the PCD pre-form is typically in the range of 0.5 to 60 microns. In one embodiment, the average size is 0.5 to 20 microns. In one embodiment, the portion of the substrate most proximate the interface with the PCD pre-form comprises cobalt or other iron-group metal, which is capable of infiltrating the PCD pre-form when molten under HPHT conditions and catalyzing the direct bonding of the diamond grains to form a coherently bonded PCD mass. The encapsulated pre-form would typically be subject to heat treatment to burn off binder and impurities, and introduced into a capsule assembly suitable for use in an HPHT sintering apparatus and process.

The attack tool insert of the invention may be used in pavement degradation drums, percussion drilling bits, shear-type rotary drilling bits used in the oil and gas industry and cutting, sawing or milling tools, for example. The geometrical form of the tool may be substantially the same as those of conventional super-hard inserts used in these applications and it would generally not be necessary to mount the inserts onto the tool holders substantially differently than conventional super-hard inserts, although some adaptation of the mounting process may be found to optimize performance in some cases.

EXAMPLES

Example 1

A set of seven pick tool inserts according to the design shown in FIG. 4 was made. The super-hard cap 31, was PCD and was bonded directly to and integrally with the reinforcing bolster portion 34, of the substrate 32. The reinforcing bolster portion 34 comprised diamond-enhanced carbide and the support portion 35, of the substrate 32, was cobalt-cemented tungsten carbide.

The PCD cap 31 comprised sintered diamond grains having an average size distribution in the range of 1 to 20 microns and having a multi-modal size distribution. This type of PCD grade and a method for making it is disclosed in U.S. patent application Ser. Nos. 10/503,323 and 11/712, 067, using technology and methods well known in the art. The Young's modulus of the PCD was found to be within the range of 1030 to 1055 GPa. The thickness 37 of the PCD cap 31 at the apex or crest 36, was about 2.2 mm, and the radius of curvature of the rounded apex 36 was about 2.0 mm.

The reinforcing bolster portion 34 comprised 9 wt. % diamond grains, 5.4 wt. % Co binder and 85.6 wt. % WC grains, the WC grains having an average size in the range of 1 to 3 microns. The diamond grains were substantially homogeneously dispersed throughout the reinforcing bolster portion 34 and had an average grain size with the range of about 200 to 250 microns. The Young's modulus of the reinforcing bolster portion 34 was estimated to be about 700±20 GPa, which is within the range of about 64% to 70% that of the PCD cap 31. The reinforcing bolster portion 34 was a contiguous region within the substrate 32 and bonded to the PCD cap 31 at a non-planar interface, and was exposed at a peripheral outer ccylindrical surface of the substrate 32. The volume of the reinforcing bolster portion 34 was approximately three to five times that of the PCD cap 31, thereby functioning as a stiff reinforcing support for the PCD cap 31. The reinforcing bolster portion 34 was bonded to the support portion of the substrate 32 at a substantially planar interface.

The insert of the example was manufactured by subjecting pre-forms of the PCD cap, the reinforcing bolster portion and the support portion to conditions of HPHT, at which diamond is thermodynamically stable. The three pre-forms were manufactured separately as three components, which were assembled and encapsulated within an enclosing sleeve of refractory metal prior to the HPHT step. The PCD pre-form was disposed in contact with the reinforcing bolster portion pre-form at the non-planar interface, and the reinforcing bolster portion was disposed in contact with the support portion at the substantially planar interface. The pre-form assembly corresponded to the general form of the sintered article, shown schematically in FIG. 3.

The reinforcing bolster portion pre-form was manufactured by a process including the steps of i) preparing the powders, ii) forming a solid green body, and iii) sintering the green body by means of a conventional hard-metal sintering method. The preparation of the starting powders involved blending diamond grains with average size in the range of about 200 to 250 microns with WC grains with average size distribution in the range of about 1 to 3 microns and cobalt powder of the type and grade that may typically be used in the powder metallurgy industry to make cemented carbide materials. The respective proportions of diamond, WC and Co powder were about 9 wt. %, 85.6 wt. % and 5.4 wt. %. The powders were blended dry by means of a multidirectional TURBULA® mixer and an organic pressing aid was introduced into the blend. A green body was then formed by uniaxial compaction of the powders into the form shown schematically in FIG. 3 at ambient (room) temperature. The green body was placed in a furnace and subjected to a conventional hard-metal sintering process, which involved heating to a temperature above 1400° C. for a period of about 2 hours in a vacuum. The sintered green body was removed from the furnace (after cooling). Examination of the body revealed that the outer portions of the diamond grains had converted to graphitic carbon, but that the inner portions or cores thereof had remained as diamond. The sintered green body was used as the bolster pre-form.

The support portion of the substrate was cobalt-cemented tungsten carbide comprising 90 wt. % WC grains and 10 wt. % Co binder, the WC grains having an average size in the range of 1 to 3 microns. The support portion was manufactured using a conventional method as is well known in the hard-metal art and in the art of preparing substrates for PCD inserts, such as earth-boring inserts for the oil and gas industry.

The PCD cap pre-form comprised diamond grains bonded together by means of an organic binder. Various types of PCD pre-forms and methods of preparing them are known in the art, and the skilled person would know how to use and adapt these to put this invention into effect.

A composite pre-form comprising the PCD pre-form was disposed in contact with the bolster pre-form at the pointed non-planar surface, and the reinforcing bolster portion was disposed in contact with the support portion. Thus assembled and mounted, the pre-form was subjected to a pressure greater than about 5.5 GPa and a temperature of about 1400° C. for about 10 minutes. These conditions were such that diamond was thermodynamically stable, resulting in the melting of the cobalt in the pre-form components, the sintering of the PCD and its integrally bonding with the reinforcing bolster portion. At the same time, the reinforcing bolster portion was integrally bonded and sintered with the support portion.

During the HPHT sintering step, the graphite surrounding the diamond cores within the bolster pre-form reconverted into diamond, albeit in a different form than that of the diamond introduced to the powders. The reconverted diamond was in granular form, the grain sizes being substantially less than that of the cores, and generally isotropically dispersed around the cores and forming a kind of concentric spherical halo. The reconversion of graphite to diamond resulted in the volume of the reinforcing bolster portion being reduced by about 30%. It is important to take this shrinkage into account when preparing the reinforcing bolster portion pre-form, so that the desired shape and size of the reinforcing bolster portion may be achieved within the finish product. The extent of this volume shrinkage could be estimated by calculation, but a series of empirical "trial and error" steps was found to allow a more accurate prediction, since it is not easy to know accurately in advance what portion of the diamond grain volume will convert to graphite during the conventional sintering step.

After the HPHT sintering step, the jacketed insert was removed from the capsule and the jacket was removed by immersion in strong acid liquor, and the insert was processed to final finish and tolerances, as is known in the art.

Initial indications from field testing are that the inserts made according to this example may have significantly higher impact resistance and effective working lives in asphalt degradation applications than PCD inserts of the prior art.

Example 2

Example 1 was repeated, except that the diamond grains introduced into the powders of the reinforcing bolster portion had an average size in the range from about 10 to 50 microns.

Examination of the sintered reinforcing bolster portion green body after it was removed from the furnace (after cooling) revealed that substantially all of the diamond grains had converted to graphite. The sintered green body was used as the bolster pre-form.

Example 3

In this example, shear cutter-type PCD-capped inserts were sintered onto substrates, where the whole of the substrate functioned as a bolster, having the necessary Young's modulus and stiffness. The working surfaces of these PCD inserts were substantially planar. The diamond-enhanced substrates were made using the method described in Example 1 to make the diamond-enhanced reinforcing bolster portion, with diamond grains being introduced into the starting powders. The respective proportions of diamond, WC and Co powder were about 7.1 wt. %, 86.4 wt. % and 6.5 wt. %. The diamond grains had an average grain size in the range from about 60 to 80 microns, as measured by a Malvern MASTERSIZER®. The diamond powder used was Element Six product PDA878 240/270.

The substrates were manufactured by a process including the following steps:
1. 62 g of diamond powder, 56 g of Co powder and 750 g 13 wt % Co WC powder, which was supplied with ~2 wt % PEG, was poured into a vessel of volume approximately 500 ml;
2. Sufficient methanol to form a slurry was added;
3. The slurry was mixed;
4. The slurry was dried and broken down to soft agglomerates with mortar and pestle;
5. The dried powder was placed into a die and compacted to form a green body.
6. The green body was sintered in a conventional carbide sintering apparatus and pressure-temperature. After sintering, the substrates had a dull gray appearance due to the presence of graphite (by this stage, at least some of the diamond in the diamond-containing samples had completely converted into graphite); and
7. The substrate, which was substantially cylindrical in form, was then ground to the same outer diameter and height.

The enhanced substrate pre-forms were substituted for conventional, Co-cemented carbide substrates in the subsequent manufacture of PCD inserts. A PCD layer was integrally sintered onto each enhanced substrate pre-form using a conventional HPHT approach. As is known in the art, this process involved disposing a diamond PCD pre-form comprising diamond grains onto one end of the substrate to form a composite pre-form. The pre-forms were assembled into conventional PCD insert capsules used for HPHT sintering, and the capsules were out-gassed using a standard process wherein air was evacuated from them, which were subsequently sealed. The capsules were subjected to a standard HPHT sintering cycle used to manufacture PCD cutter inserts for rock drilling applications (i.e., at a pressure above about 5 GPa and a temperature greater than about 1400° C.). During the HPHT cycle, substantially all of the non-diamond carbon in the substrates converted into diamond, as in Example 1.

Example 4

A shaped cutter insert with DEC bolster portion having a geometry, as per FIG. 3 was constructed. A diamond table (PCD) was compacted from granules with organic processing aids that were burned off prior to sintering. The diamond table layer thickness and shape was defined by compacting with appropriately shaped tooling.

The diamond compact was comprised of a diamond mix wherein the diamond particle size distribution was a broad multimodal with peaks in the range from about 10 um to 45 um. The total particle size range was from ~2 um to 50 um.

The diamond compact contained Co as admix but was primarily infiltrated with Co from the substrate and bolster portion to achieve sintering. The bolster portion was comprised of an admix of 1-6 um WC particles with ~22 um diamond particles and cobalt.

Volume ratios of WC:diamond were varied between 1:1 and 3:1. A higher Young's modulus is expected with 1:1 ratio.

Both the diamond and bolster portion compacts were compacted together during final stages of assembly to ensure a complete bond between the two layers. This also ensured good densification prior to removal of the organic processing aids.

A planar interface substrate was placed at the base of the bolster portion. This pre-sintered WC/Co composite acted as a firm base during high pressure sintering and also provided additional Co for infiltration and proper sintering of both the bolster portion and diamond table.

Although the foregoing description of consolidated super-hard materials, production methods, and various applications of them contain many specifics, these should not be construed as limiting the scope of the present invention, but merely as providing illustrations of some exemplary embodiments. Similarly, other embodiments of the invention may be devised, which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced.

The invention claimed is:

1. An insert for an attack tool, comprising:
   a substrate comprising:
      a support portion; and
      a substantially homogeneous reinforcing bolster portion bonded to the support portion and comprising:
         a binder metal selected from the group consisting of cobalt, iron, manganese, and nickel;
         at least 7 weight percent diamond particles disposed within the binder metal and comprising first diamond particles having a first average size, and second diamond particles having a second average size smaller than the first average size; and
         at least 85 weight percent refractory metal carbide particles disposed within the binder metal; and
   a super-hard cap directly bonded to a surface of the substantially homogeneous reinforcing bolster portion and having a smaller volume than the substantially homogeneous reinforcing bolster portion and an average Young's modulus greater than 900 GPa, an average Young's modulus of the substantially homogeneous reinforcing bolster portion within a range of from 80 percent to 90 percent of the average Young's modulus of the super-hard cap.

2. The insert of claim 1, wherein the first average size is greater than 50 microns.

3. The insert of claim 1, wherein the super-hard cap has an apex exhibiting a radius of curvature between 1.4 mm and 4 mm.

4. The insert of claim 1, wherein the super-hard cap exhibits an apex, a thickness of the super-hard cap from a bottom of the super-hard cap to the apex between 1.4 mm and 2.4 mm.

5. The insert of claim 1, wherein the average Young's modulus of the super-hard cap is greater than 960 GPa.

6. The insert of claim 1, wherein the average Young's modulus of the substantially homogeneous reinforcing bolster portion is between 650 GPa and 900 GPa.

7. A method of manufacturing the insert of claim 1, the method comprising:
   forming a pre-form assembly by assembling and contacting a pre-form for the substantially homogeneous bolster portion with a pre-form for the support portion and a pre-form for a polycrystalline diamond cap, the pre-form for the reinforcing bolster portion comprising diamond cores surrounded by graphite; and
   subjecting the pre-form assembly to ultra-high pressure and temperature conditions at which diamond is thermodynamically stable.

8. A method of using the insert of claim 1, comprising contacting a hard material selected from the group consisting of rock, concrete, and asphalt with the super-hard cap to degrade the hard material.

9. The insert of claim 1, wherein the volume of the substantially homogeneous reinforcing bolster portion is at least two times the volume of the super-hard cap.

10. The insert of claim 1, wherein the surface of the substantially homogeneous reinforcing bolster portion is nonplanar.

11. The insert of claim 1, wherein a portion of the surface of the substantially homogeneous reinforcing bolster portion remains exposed.

12. The insert of claim 1, wherein the first average size is least ten times the second average size.

13. The insert of claim 12, wherein the first diamond particles are surrounded by the second diamond particles.

14. The insert of claim 1, wherein sidewalls of the substantially homogeneous reinforcing bolster portion are substantially coplanar with sidewalls of the support portion and the super-hard cap.

15. The insert of claim 14, wherein the sidewalls of the substantially homogeneous reinforcing bolster portion remain substantially exposed.

16. The insert of claim 1, wherein an average grain size of the refractory metal particles is within a range of from 1 micron to 3 microns.

17. The insert of claim 16, wherein an average grain size of the diamond particles is within a range of from 200 microns to 250 microns.

18. An insert for an earth-boring tool, comprising:
   a substrate comprising a substantially homogeneous reinforcing bolster portion bonded to a support portion and comprising:
      a cobalt binder;
      at least 7 weight percent diamond particles disposed within the cobalt binder and comprising first diamond particles having a first average size and second diamond particles having a second average size smaller than the first average size; and
      at least 85 weight percent tungsten carbide particles disposed within the cobalt binder; and
   a super-hard material bonded to the substantially homogeneous reinforcing bolster portion of the substrate at an interface and having an average Young's modulus greater than 900 GPa, the substrate exhibiting a volume between about two times and about ten times a volume of the super-hard material and an average Young's modulus within a range of from 80 percent to 90 percent of the average Young's modulus of the super-hard material.

* * * * *

UNITED STATES PATENT AND TRADEMARK OFFICE
CERTIFICATE OF CORRECTION

PATENT NO. : 9,566,688 B2  
APPLICATION NO. : 13/124855  
DATED : February 14, 2017  
INVENTOR(S) : Cornelis Roelof Jonker, Roger William Nigel Nilen and Anthony Albert DiGiovanni Page 1 of 1

It is certified that error appears in the above-identified patent and that said Letters Patent is hereby corrected as shown below:

In the Specification

| | | |
|---|---|---|
| Column 5, | Line 1, | change "most preferably," to --more preferably,-- |
| Column 8, | Line 6, | change the heading "SPECIFIC DESCRIPTION" to --DETAILED DESCRIPTION-- |
| Column 8, | Line 23, | change "carbide,", or DEC," to --carbide," or DEC,-- |
| Column 8, | Line 48, | change ""metallic alloy,", or more" to --"metallic alloy," or more-- |
| Column 9, | Line 63, | change "cap is integrally" to --cap **31** is integrally-- |
| Column 10, | Line 42, | change "or minimising the" to --or minimizing the-- |
| Column 12, | Line 2, | change "portion **34**, of" to --portion **34** of-- |
| Column 12, | Line 4, | change "portion **35**, of the substrate **32**, was" to --portion **35** of the substrate **32** was-- |
| Column 12, | Line 28, | change "ccylindrical surface" to --cylindrical surface-- |

Signed and Sealed this  
Twenty-sixth Day of December, 2017

Joseph Matal  
*Performing the Functions and Duties of the  
Under Secretary of Commerce for Intellectual Property and  
Director of the United States Patent and Trademark Office*